United States Patent [19]

Warnecke et al.

[11] Patent Number: 4,457,679

[45] Date of Patent: Jul. 3, 1984

[54] VANE PUMP WITH UNILATERAL BEARING

[75] Inventors: Rolf Warnecke; Peter Buchholz, both of Gefhorn, Fed. Rep. of Germany

[73] Assignee: Volkswagenwerk Aktiengesellschaft, Wolfsburg, Fed. Rep. of Germany

[21] Appl. No.: 376,616

[22] Filed: May 10, 1982

[30] Foreign Application Priority Data

May 14, 1981 [DE] Fed. Rep. of Germany ....... 3119230

[51] Int. Cl.³ .................... F04B 17/00; F04B 35/00
[52] U.S. Cl. ..................................... 418/91; 418/268; 417/362
[58] Field of Search ............... 123/41.86, 198 C, 572; 403/248, 255, 260; 417/359, 362; 418/259, 266, 267, 268, 91, 93

[56] References Cited

U.S. PATENT DOCUMENTS

| | | | |
|---|---|---|---|
| 1,701,792 | 2/1929 | Nelson | 418/91 |
| 1,915,800 | 6/1933 | Price | 418/269 |
| 2,258,009 | 10/1941 | Horton | 417/313 |
| 2,875,626 | 3/1959 | Niederer | 417/362 |
| 3,776,651 | 12/1973 | Peter | 403/248 |
| 4,080,122 | 3/1978 | Skrivanek | 418/81 |
| 4,231,727 | 11/1980 | Buchholz | 418/76 |
| 4,293,290 | 10/1981 | Swanson | 418/206 |

FOREIGN PATENT DOCUMENTS

| | | |
|---|---|---|
| 2405574 | 8/1975 | Fed. Rep. of Germany . |
| 2405575 | 8/1975 | Fed. Rep. of Germany . |
| 912119 | 12/1962 | United Kingdom . |
| 1474353 | 5/1977 | United Kingdom . |

Primary Examiner—Leonard E. Smith
Assistant Examiner—Jane E. Obee
Attorney, Agent, or Firm—Brumbaugh, Graves, Donohue & Raymond

[57] ABSTRACT

The invention relates to a motor-driven vane pump, and in particular to vane pumps for generating a vacuum used to operate a secondary unit of an automobile. The vane pump comprises a cast approximately bell-shaped pump housing in which a rotor is eccentrically supported. The rotor is rigidly connected with and driven by a rotor shaft, and carries a plurality of sealing vanes slidably mounted in guide slots provided along its periphery. A rotationally symmetrical driving bell surrounds the pump housing with play, and is rigidly connected with the rotor shaft, which sealingly passes through the bottom of the pump housing. The rotor shaft is thus supported on only one side in the housing cover which closes off the end of the pump housing opposite the chamber bottom.

14 Claims, 6 Drawing Figures

VANE PUMP WITH UNILATERAL BEARING

BACKGROUND OF THE INVENTION

This invention relates to rotary vacuum pumps, and in particular, to rotary vacuum pumps having movable vanes mounted in a rotor which is eccentrically mounted in a cylindrical rotor chamber.

Vane pumps of the general type disclosed are commonly used for fluid pumping and pressure generating applications. Vane pumps used to convey liquid media are disclosed, for example, in German Offenlegungsschriften No. 24 05 574 and No. 24 05 575. A vane pump for generating a vacuum for, e.g., a vacuum-operated brake booster in an automobile, is disclosed in commonly-owned U.S. Pat. No. 4,231,727.

In these known vane pumps, the rotor shaft is supported in a single bearing, formed by a special bore in the pump housing. The pump housing is provided with a relatively long axial extension projecting from the chamber bottom, which axial extension has a longitudinal bore. The rotor shaft extends through the extension bore, and the shaft end projecting from the extension carries at its end a pinion gear or a belt pulley.

The present invention is an improvement over these known vane pumps, and has as one of its objects the provision of a vane pump that is comparatively structurally compact in both its axial dimension and in diameter.

SUMMARY OF THE INVENTION

In accordance with the invention, there is provided a rotary vane pump including a cast pump housing which is approximately bell-shaped. The end of the pump housing is closed in a pressure-resistant manner by a housing cover, and defines a rotor chamber therewithin. The housing cover may be provided with radial extensions to form a base plate by which the vane pump may be fixed to an engine housing. A cylindrical rotor is supported eccentrically in the rotor chamber, and is rigidly connected with and driven by a rotor shaft.

The rotor has a plurality of vanes, slidably mounted in guide slots in the rotor, which are sealingly urged against the walls of the rotor chamber by hydraulic oil pressure, forming variable volume chambers between the vanes. The volume of the chambers varies periodically as the rotor rotates, creating a negative pressure which can be tapped via an intake connection opening into the rotor chamber. An outlet connecton also is provided whereby the medium drawn into the rotor chamber is exhausted. The hydraulic oil is introduced into the nose of the guide slots of the rotor in which the vanes are slidably mounted. Because of the clearance between the vanes and the guide slots, a small portion of this oil passes into the rotor chamber. The escaping oil lubricates the vanes in the guide slots, and promotes a better seal between the chamber wall and the sealing edges of the vanes. This escaping oil also serves to lubricate the rotor shaft.

To ensure a satisfactory and operationally safe bearing of the rotor, the housing cover plate includes a cylindrical extension which projects into the pump housing and accommodates the rotor shaft. Annular gaps, both axial and radial, define a clearance between the rotor and the cylindrical extension so that the rotor proper surrounds the cylindrical extension with both axial and radial play. The cylindrical extension ranges over approximately one half of the axial length of the rotor.

The end of the rotor shaft opposite the housing cover plate extends through the chamber bottom of the pump housing and is rigidly connected with a rotationally symmetric driving bell which surrounds the pump housing with play. The outer surface of the driving bell may be utilized as a running surface for a driving belt, such as a smooth belt, a toothed belt or a V-belt, or alternatively, the outer surface of the bell may be fashioned as a pinion gear for meshing with a driving gear or the like.

The intake and outlet connections, and the hydraulic oil connection, all may be provided in the housing cover plate.

For a better understanding of the present invention, together with other and further objects, reference is made to the following description, taken in conjunction with the accompanying drawings, and its scope will be pointed out in the appended claims.

DETAILED DESCRIPTION OF EXEMPLARY EMBODIMENTS

Figure 1:
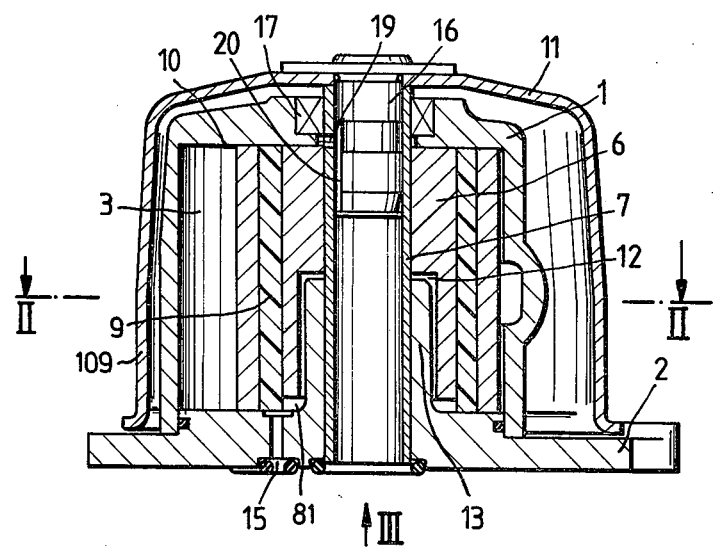
FIG. 1 is a longitudinal sectional view through a vane pump in accordance with the present invention.
Figure 2:
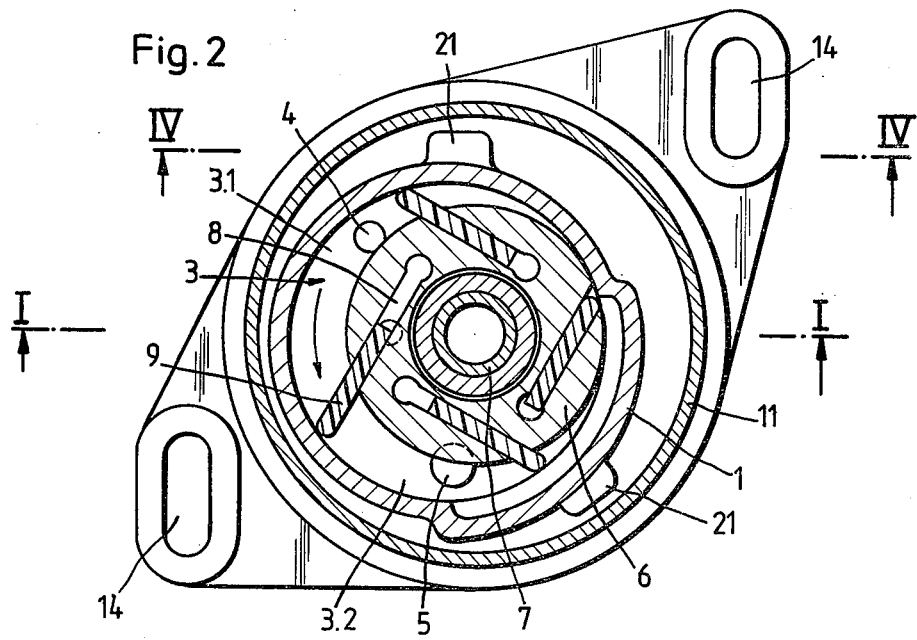
FIG. 2 is a cross section of the vane pump along the line II—II in FIG. 1.

With reference to FIGS. 1 and 2, the vane pump of the present invention comprises an essentially cylindrical pump housing 1 defining a cylindrical rotor chamber 3 therein, the end of which is closed off by a housing cover 2 in a pressure-resistant fashion. The pump housing 1 preferably is cast, and is approximately bell-shaped. The bottom of the pump housing 1 forms the chamber bottom 10. A cylindrical rotor 6 is supported eccentrically in the rotor chamber 3, and is driven by a rotor shaft 7 with which it is rigidly connected.

The rotor 6 has tangentially arranged guide slots 8 distributed uniformly over its periphery (Four guide slots 8 are provided in the rotor 6 in the illustrated embodiment). Each guide slot 8 slidably supports a sealing vane 9. Each sealing vane 9 sealingly abuts the housing cover 2 and the chamber bottom 10, and is urged into sealing contact against the wall of the chamber 3 by hydraulic oil pressure introduced into the nose of the guide slots 8. A small portion of the hyraulic oil escapes into the rotor chamber 3 via the gap between the sealing vanes 9 and the guide slots 8, thus lubricating the vanes 9 in the slots 8 and promoting a better seal between the chamber wall and the sealing edges of the sealing vanes 9. This escaped oil also serves to lubricate the rotor shaft 7, as will be described more fully below.

The space between each two adjacent sealing vanes 9 defines a chamber of variable volume, the volumes of which periodically vary between a maximum and minimum. With reference to FIG. 2, the volume of chamber 3.1 increases as the rotor 6 rotates in the direction of the arrow, so that as a result of the increasing volume a vacuum is produced in the chamber 3.1. This negative pressure can be tapped through an intake connection 4 which opens into the chamber 3.1 and used to activate a vacuum-operated secondary unit, e.g., a vacuum-operated brake booster.

Correspondingly, as the volume in the chamber 3.1 increases, the volume of the adjacent chamber 3.2 decreases from the maximum volume toward the minimum volume as the rotor 6 rotates in the direction of the arrow. An outlet connection 5 is provided in the chamber 3.2 to exhaust the medium (preferably a gaseous medium) which is drawn into the rotor chamber 3 via the intake connection 4.

As described above, the rotor shaft 7 is rigidly connected with the rotor 6 (preferably a sintered component) and is supported only on one side, i.e. the rotor shaft 7 is supported for rotation unilaterally in the housing cover 2. In the illustrated embodiment, the rotor shaft 7 is supported, without the need for interposing of additional bearings or seals, directly in a corresponding bearing bore of the housing cover 2.

In order to ensure an operationally safe and satisfactory bearing of the rotor 6, the housing cover 2 includes a cylindrical extension 13 projecting into the interior of the pump housing 1. The extension 13 has a longitudinal bore which accommodates the rotor shaft 7. A clearance 12, extending in both the axial and radial directions and terminating in a ring-shaped chamber 81 adjacent to the cover 2, is provided between the rotor 6 proper and the extension 13 so that the rotor 6 surrounds the extension with an axial and a radial play. The cylindrical extension 13 ranges over approximately one-half (½) the axial length of the rotor. Thus, a good bearing base for the rotor 6 is obtained, while the overall axial dimension of the pump is small in comparison to conventional pumps.

An advantage of the one-sided support of the rotor shaft 7 is that larger tolerances are acceptable in the production of the individual components of the vane pump. By comparison, due to the eccentric support of the rotor 6 within the rotor chamber 3, even if tolerances are kept relatively strict with respect to the two bearing points in two-sided bearings of a rotor shaft of a conventional vane pump, errors may result in alignment which may be controlled or remedied only with difficulty and/or added expense.

The end of the rotor shaft 7 opposite the housing cover 2 passes axially through the chamber bottom 10 of the pump housing 1, and is rigidly connected with a rotationally symmetric driving bell 11 by means of a disk-shaped bolt 16 pressed into the end of the hollow shaft 7 which bell surrounds the pump housing 1 with play. A conventional shaft ring seal 17 is provided between the rotor shaft 7 and the chamber bottom 10 to ensure a proper seal between the rotor chamber 3 and the ambient atmosphere.

Figure 6:
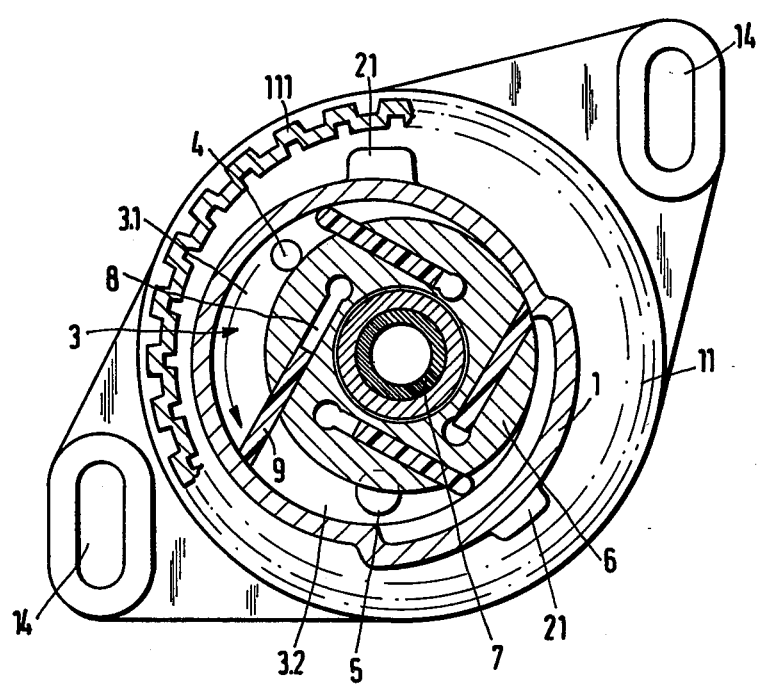
FIG. 6 is a cross-sectional view similar to that of FIG. 2 showing another embodiment of the invention.

The nested construction of the driving bell 11 (which together with the rotor 6 and rotor shaft 7 forms one structural unit) and the bell-shaped pump housing 1 results in a relatively short (measured axially) vane pump structure. This ability to render a short vane pump is enhanced in that the driving forces for the rotor 6 can act on the driving bell 11 on a region 109 which surrounds the cylindrical extension 13 of the housing cover 2, i.e., the forces are bending momentfree, and the transmission of the driving forces may be adjusted to suit particular requirements. For example, it is possible to utilize the outer surface of the driving bell 11 as a running surface for a driving belt, such as a smooth belt, a toothed belt or a V-belt looped around the driving bell 11. It is also possible to fashion the surface of the driving bell 11 in the region axially co-extensive with the extension 13 as a pinion gear 111 for meshing with a driving gear or the like as shown in FIG. 6, for example.

In the illustrated embodiment, all of the pump connections, and in particular the intake connection 4 and the outlet connection 5, are arranged in the housing cover 2. A further hydraulic oil connection 15 is provided in the housing cover 2 through which the hydraulic oil is introduced by way of the ring-shaped chamber 81 into the base of the guide slots 8 to constantly urge the sealing vanes 9 against the wall of the rotor chamber 3 as described above. This supply of oil also may be used advantageously to lubricate the rotor shaft 7.

It will be appreciated from FIG. 1 by those skilled in the art that a connection is provided between the hydraulic oil connection 15 and the axial and radial annular gaps, which define the clearance 12 around the extension 13, by which the shaft 7 receives a flow of lubricating oil. The end of the shaft 7 which is flush with the housing cover 2 is subjected to a pressure (approximately atmospheric pressure) which is lower than the pressure prevailing in the annular gaps 12. A constant flow of lubricating oil between the shaft 7 and the cylindrical extension 13 is thus ensured due to the resulting pressure differential along the shaft 7.

Because the hydraulic oil connection 15 and the outlet connection 5 are arranged in the housing cover 2, it is possible to fasten the housing cover 2 of the vane pump directly to the casing of the automobile engine, and to connect at least these two connections with connections or passages in the engine housing. This is especially the case when the vane pump is to be used as a vacuum pump, for example, for supplying vacuum to the brake booster of an automobile.

The housing cover 2 of the vane pump is provided with two elongated slots 14 in its radially extended regions through which the vane pump may be fixed on the engine casing by fixing screws or the like. The elongated slots 14 permit the vane pump to be pivotably adjustable when being mounted on the engine casing.

The outlet connection 5 may open through a corresponding bore or the like directly into the interior of the crankcase (where an at least approximately atmospheric pressure prevails). The hydraulic oil connection 15 may be connected, by way of a line or the like opening into the engine casing, directly with the lubrication circuit of the engine (preferably with one of the hydraulic oil-lubricated camshaft bearings).

Similarly, the intake connection 4 may be arranged in the housing cover 2, and can be connected with, for example, a suction line or the like passing through the engine housing and leading to a secondary unit to be supplied with negative pressure, e.g., a brake booster.

Alternatively, it is possible to arrange the intake connection 4 in the zone close to the cover of the housing wall, although in such an embodiment it would be necessary to shorten the driving bell 11. Because all of the pump connections 4, 5 and 15 are arranged in the housing cover 2, it is possible to incorporate the vane pump in accordance with the invention within the full enclosure of the toothed belt drive customary in automobile engines.

Because the vane pump according to the invention is structurally relatively short, and the driving forces are transmitted to the rotor shaft 7 bending moment-free, the pump may be used to special advantage as a tensioning or a deflection roller within a belt drive (in particular a toothed belt drive) whereby, via an endless belt, the rotating shaft of a main or primary unit (e.g., the crankshaft of the engine) drives an auxiliary or secondary unit (e.g., a generator, water pump or fan), and wherein the belt must be constantly tensioned.

If the vane pump is used as a tensioning roller, it must be possible to mount the pump across the rotor shaft in an adjustable manner. As noted above, the elongated slots 14 permit the adjustment of the vane pump on the engine casing. Similarly, the pump connections 4, 5 and 15 open into elongated clearances in the housing cover 2 to ensure reliable connections with the corresponding lines and passages in the engine housing. The seal between the housing cover 2 and the engine housing is by conventional means, such as by known O-rings 18, gaskets, or the like.

It will be appreciated that in addition to a gaseous medium being drawn into the intake connection 4 and discharged into the crankcase, the leakage or overflow oil from the guide slots 8 which enters the rotor chamber 3 also is drawn in and discharged into the crankcase. Because the rotor shaft 7 is hollow, the atmospheric pressure prevailing at the cover side end of the rotor shaft 7 is used for pressure relief of the shaft ring seal 17. A radial bore 19 is provided in the shaft 7 directly below the shaft ring seal 17, and is situated in the region of an axial channellike longitudinal groove 20 in the bolt 16 which rigidly connects the hollow rotor shaft 7 with the driving bell 11.

Figure 3:
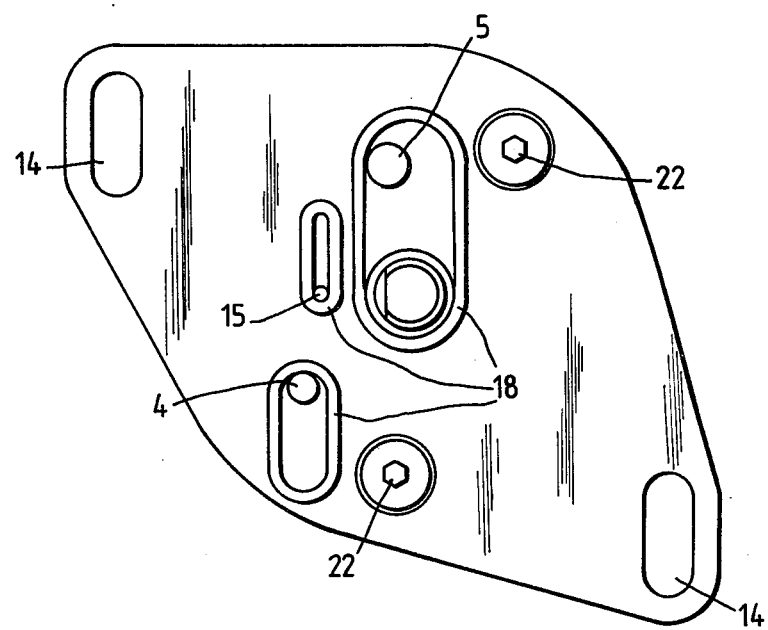
FIG. 3 is a plan view of the housing cover of the pump along the line III in FIG. 1.
Figure 4:
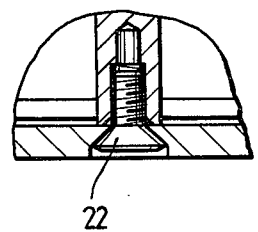
FIG. 4 is a detailed sectional view along the line IV—IV in FIG. 2.

The housing cover 2 is fixed to the engine housing by fastening screws 22 (FIGS. 3–4) which engage the cover 2 through two thickened ribs 21 (FIG. 2) having threaded bores therein. The two ribs 21 are arranged in the wedge area formed by the eccentricity of the pump housing 1 relative to the driving bell 11, which contributes to a more compact construction with respect to the diameter of the vane pump.

Figure 5:
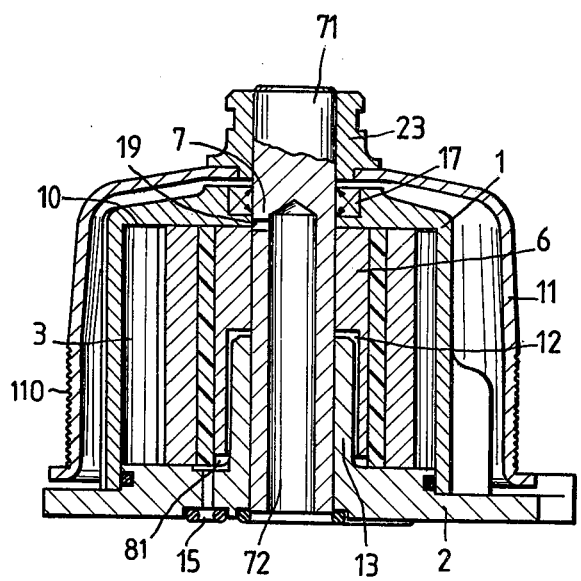
FIG. 5 is a longitudinal sectional view through a vane pump in accordance with an alternative embodiment of the present invention.

An alternative embodiment of the present invention is illustrated in FIG. 5, with like parts being identified with like reference numerals. The alternative embodiment differs from the embodiment of FIGS. 1–4 in that the rotor shaft 7 is not hollow, but rather is solid and formed with a blind bore 72 extending from the housing cover 2 as far as the level of the chamber bottom 10. As in the embodiment of FIG. 1, a radial bore 19 provides pressure relief of the shaft ring seal 17. The driving bell 11 and the rotor shaft 7 are press-fit by a hub 23 on the solid end section 71 of the shaft 7 which projects through the chamber bottom 10. In the embodiment illustrated in FIG. 5, the portion of the driving bell surrounding the cover extension 13 is formed with a toothed surface 110 to be engaged by a toothed driving belt (not shown).

We claim:

1. In a motor driven vane pump comprising an approximately bell-shaped pump housing having a housing bottom and containing a cylindrical rotor chamber with an intake connection and an outlet connection, said housing bottom forming a chamber bottom of said rotor chamber, a housing cover closing, in a sealed manner, the end of said rotor chamber opposite said chamber bottom, a cylindrical rotor arranged eccentrically in said rotor chamber and having a rotor shaft fixedly connected therewith and having an end passing in a sealed fashion axially through said chamber bottom, sealing vanes distributed along the periphery of said cylindrical rotor, said vanes displaceably mounted in guide slots in said rotor, said sealing vanes being axially sealed against said housing cover and said chamber bottom, and being sealingly urged, in the radial direction, against interior walls of said rotor chamber, the chamber volume formed between each two sealing vanes varying periodically on rotation of said rotor between a minimum volume and a maximum volume, the improvement wherein said housing cover is provided with a hollow cylindrical extension projecting into the interior of said housing at least approximately one half of the axial length of said rotor, said extension projecting into a cylindrical clearance in said rotor, said rotor shaft extending through and being unilaterally supported by said extension, wherein said rotor shaft end passing through said chamber bottom is rigidly connected with a rotationally symmetrical driving bell which surrounds said pump housing with play, such that driving forces acting on the outer periphery of said driving bell in rotating said rotor, are applied in a region of said driving bell surrounding said extension.

2. The vane pump according to claim 1, wherein said housing cover extends at least partially in the radial direction beyond said housing and forms a base plate for securing said vane pump to an object.

3. The vane pump according to claim 1, wherein said rotor shaft is a hollow shaft and said driving bell is rigidly connected with said hollow shaft by means of a diskshaped bolt pressed into the end of said hollow shaft.

4. The vane pump according to claim 1, wherein said cylindrical extension and said cylindrical rotor clearance of said rotor define an annular gap both axially and radially into which lubricating oil can be delivered under pressure to said rotor shaft supported in said hollow cylindrical extension, the end of said shaft which is at least approximately flush with said housing cover being subjected to at least approximately atmospheric pressure so that, as a result of a pressure differential present along said shaft, a steady flow of lubricating oil is ensured between said shaft and said hollow cylindrical extension.

5. In a motor driven vane pump comprising an approximately bell-shaped pump housing having a housing bottom and containing a cylindrical rotor chamber with an intake connection and an outlet connection, said housing bottom forming a chamber bottom of said rotor chamber, a housing cover closing, in a sealed manner, the end of said rotor chamber opposite said chamber bottom, a cylindrical rotor arranged eccentrically in said rotor chamber and having a rotor shaft fixedly connected therewith and having an end passing in a sealed fashion axially through said chamber bottom, sealing vanes distributed along the periphery of said cylindrical rotor, said vanes displaceably mounted in guide slots in said rotor, said sealing vanes being axially sealed against said housing cover and said chamber bottom, and being sealingly urged, in the radial direction, against interior walls of said rotor chamber, the chamber volume formed between each two sealing vanes varying periodically on rotation of said rotor between a minimum volume and a maximum volume, the improvement wherein said housing cover is provided with a hollow cylindrical extension projecting into the interior of said housing at least approximately one half of the axial length of said rotor, said extension projecting into a cylindrical clearance in said rotor, said rotor shaft extending through and being supported by said extension, wherein said rotor shaft end passing through said chamber bottom is rigidly connected with a rotationally symmetrical driving bell which surrounds said pump housing with play, such that driving forces acting on the outer periphery of said driving bell in rotating said rotor, are applied in a region of said driving bell surrounding said extension, wherein said cylindrical extension and said cylindrical rotor clearance of said rotor define an annular gap both axially and radially into which lubricating oil can be delivered under pressure to said rotor shaft supported in said hollow cylindrical extension, the end of said shaft which is at least approximately flush with said housing cover being subjected to at least approximately atmospheric pressure so that, as a result of a pressure differential present along said shaft, a steady flow of lubricating oil is ensured between said shaft and said hollow cylindrical extension, wherein said sealing vanes are urged against the cylindrical chamber wall by means of hydraulic oil pressure which is introduced below the sealing vanes into said guide slots via a hydraulic oil pressure connection, and wherein said clearance between said hollow cylindrical extension and said rotor is in connection with said guide slots and supplied with hydraulic oil pressure from the same source of hydraulic aid as said sealing vanes.

6. The vane pump according to claim 5, wherein said pressure oil is taken from a lubricating oil circuit of a motor, preferably from one of the pressure oil-lubricated camshaft bearings of said motor.

7. The vane pump according to claim 1, wherein the outer surface of said driving bell in the region axially co-extensive with said hollow cylindrical extension is shaped as running surface for a driving belt.

8. The vane pump according to claim 1, wherein the outer surface of said driving bell in the region axially co-extensive with said hollow cylindrical extension is fashioned as pinion for meshing with a driving gear.

9. The vane pump according to any of claims 1–8, further comprising fixing means for facilitating the assembly of said vane pump with an object whereby said object and said rotor shaft are pivotably adjustable relative to each other.

10. The vane pump according to claim 9, wherein said housing cover includes at least one elongated slot for accommodating a screw bolt.

11. The vane pump according to claim 1 or 2, wherein said rotor shaft is provided with a pocket bore extending in the axial direction from the housing cover as far as the level of said chamber bottom, and further comprising a solid end section passing axially through said chamber bottom on which is press-fit a hub means rigidly connecting said rotor shaft with said driving bell.

12. The vane pump according to any of claim 10 wherein said sealing vanes are urged by means of hydraulic oil pressure against said cylindrical chamber wall, and a portion of said oil flows between said chamber wall and said sealing vanes and is removed from said rotor chamber via said outlet connection, wherein said pressure connection is arranged on said housing cover;

13. The vane pump according to claim 1 wherein said outlet connection is arranged on said housing cover.

14. The vane pump according to claim 12 wherein said intake connection is arranged on said housing cover.

* * * * *